United States Patent [19]

Senghaas et al.

[11] Patent Number: 4,583,443
[45] Date of Patent: Apr. 22, 1986

[54] ELECTRONIC METRONOME AND RHYTHM GENERATOR

[75] Inventors: Karl A. Senghaas; Peter Senghaas, both of San Antonio, Tex.

[73] Assignee: Harry Yokel, San Antonio, Tex.

[21] Appl. No.: 596,896

[22] Filed: Apr. 5, 1984

[51] Int. Cl.[4] ............................................. G04F 5/02
[52] U.S. Cl. .................................................... 84/484
[58] Field of Search .............................. 84/484, 470 R

[56] References Cited

U.S. PATENT DOCUMENTS

| | | | |
|---|---|---|---|
| 2,817,208 | 12/1957 | Franz | 58/130 |
| 3,271,670 | 9/1966 | Esakov et al. | 324/68 |
| 3,467,959 | 9/1969 | Zazofsky | 340/384 |
| 3,534,649 | 10/1970 | Andersson | 84/484 |
| 3,760,681 | 9/1973 | Kennedy | 84/484 |
| 3,818,693 | 6/1974 | Allard | 58/130 E |
| 3,905,269 | 9/1975 | Doerksen et al. | 84/470 |
| 3,991,648 | 11/1976 | Karpowicz | 84/470 |
| 4,014,167 | 3/1977 | Hasegawa et al. | 58/130 E |
| 4,018,131 | 4/1977 | Cannon | 84/484 |
| 4,090,355 | 5/1978 | Morohoshi | 58/130 |
| 4,193,257 | 3/1980 | Watkins | 84/484 |
| 4,204,400 | 5/1980 | Morohoshi et al. | 84/484 |
| 4,213,372 | 7/1980 | Sasaki et al. | 84/484 X |
| 4,380,185 | 4/1983 | Holcomb | 84/1.03 |

Primary Examiner—L. T. Hix
Assistant Examiner—Douglas S. Lee
Attorney, Agent, or Firm—Hubbard, Thurman, Turner & Tucker

[57] ABSTRACT

An electronic metronome for training musical students in various rhythm patterns is disclosed. The electronic metronome is battery powered and completely contained within a hand held component case for ease in transport and storage. A solid state memory device which may be selectively programmed with a plurality of digital logic signals by means of manual switches is automatically and repetitively accessed in a selected sequential order and at a selected rate and the digital logic signals stored therein are converted to audible "clicks" or tones and inaudible pauses. Variable amplification circuitry coupled to the output of the memory device permits the volume of the clicks or tones to be selected by the operator and a pair of light emitting diodes permits the output of the memory device to be simultaneously converted to a visual signal. In a preferred embodiment of the present invention, selectable timing circuitry included within the access circuitry permits the output of the memory device to be accessed at a number of variable clock rates to further enhance the flexibility of the electronic metronome.

23 Claims, 2 Drawing Figures

ELECTRONIC METRONOME AND RHYTHM GENERATOR

BACKGROUND OF THE INVENTION

This invention relates to metronomes in general and in particular to electrically powered metronomes for generating programmable rhythm sequences. Still more, this invention relates to hand held electronic metronomes and rhythm generators which are battery powered.

Metronomes are well known in the musical art. Early metronomes were essentially mechanical clockwork mechanisms which included a pendulum or swinging rod with a movable weight which could be utilized to regulate the speed of the pendulum's movement. This type of metronome was perfected by Johann Malzel of Germany in 1816.

Electrical metronomes have been known since 1938 and represent an increase in the convenience and reliability of metronomes; however, such devices are still cumbersome and not easily transported. Further, known electrical metronomes are generally utilized to generate regular repetitive beat sequences and cannot be utilized to generate complex variables or irregular sequences. It should therefore be apparent that a need has existed for a metronome which was convenient to transport and store and which would be sufficiently flexible in operation to permit complex rhythm patterns to be generated.

SUMMARY OF THE INVENTION

It is therefore one object of the present invention to provide an improved metronome.

It is another object of the present invention to provide an improved electronic metronome.

It is yet another object of the present invention to provide an improved electronic metronome which is self-contained and small enough to be hand held.

It is another object of the present invention to provide an improved electronic metronome which can be simply and conveniently programmed to reproduce complex rhythm patterns.

It is still another object of the present invention to provide an improved electronic metronome which is capable of generating both an audible and visual indication of a selected rhythm pattern.

The foregoing objects are achieved as is now described. The electronic metronome of the present invention is battery powered and completely contained within a hand held component case for ease in transport and storage. A solid state memory device which may be selectively programmed with a plurality of digital logic signals by means of manual switches is automatically and repetitively accessed in a selected sequential order and the digital logic signals stored therein are converted to audible "clicks" or tones. Variable amplification circuitry coupled to the output of the memory device permits the volume of the clicks or tones to be selected by the operator and a pair of light emitting diodes permits the output of the memory device to be simultaneously converted to a visual signal. In a preferred embodiment of the present invention, selectable timing circuitry included within the access circuitry permits the output of the memory device to be accessed at a number of variable clock rates to further enhance the flexibility of the electronic metronome.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
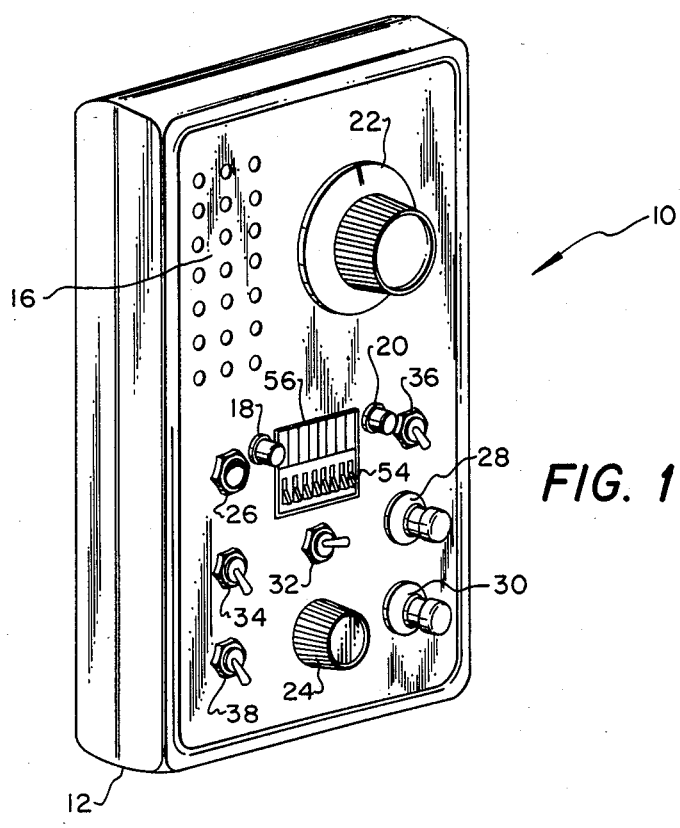
FIG. 1 is a perspective view of the electronic metronome of the present invention.

With reference now to the figures and in particular with reference to FIG. 1, there is depicted a perspective view of electronic metronome 10 of the present invention. As can be seen, electronic metronome 10 is entirely enclosed within a component case 12 which is preferably constructed of a durable, easily fabricated material such as polystyrene or a similar plastic material. Disposed within component case 12 are the electronic components (not shown) of electronic metronome 10 which generate a plurality of audible signals through a speaker 14 (also not shown) which is mounted behind grill 16. Those skilled in the art will appreciate that speaker 14 can be implemented utilizing a standard miniaturized cone speaker or by utilizing a piezo electric transducer or any other transducer capable of producing an audible output from a series of electrical signals.

Disposed on the exterior of component case 12 are visual display outputs 18 and 20 which are implemented utilizing a pair of ordinary light emitting diodes. A multiple position switch 22 is utilized to select a variable clock rate and volume switch 24 may be utilized to vary the amplification of a series of audible "clicks" or tones produced by the circuitry of electronic metronome 10. An output jack 26 is also provided within component case 12 and may be utilized to couple the output of electronic metronome 10 to an ordinary pair of earphones (not shown) for private listening, or to an existing amplification system.

A number of other switches are provided on the exterior of component case 12, including: beat switch 28; pause switch 30; read/write switch 32; tone/click switch 34; and timer switch 36. Additionally, a multiple position dip switch 54 and a program status display 56 are also disposed on the exterior of component case 12. The operation and purpose of these switches will be explained in detail with regard to FIG. 2. Finally, a power switch 38 is provided for coupling electrical power to the various electronic components disposed within component case 12.

Figure 2:
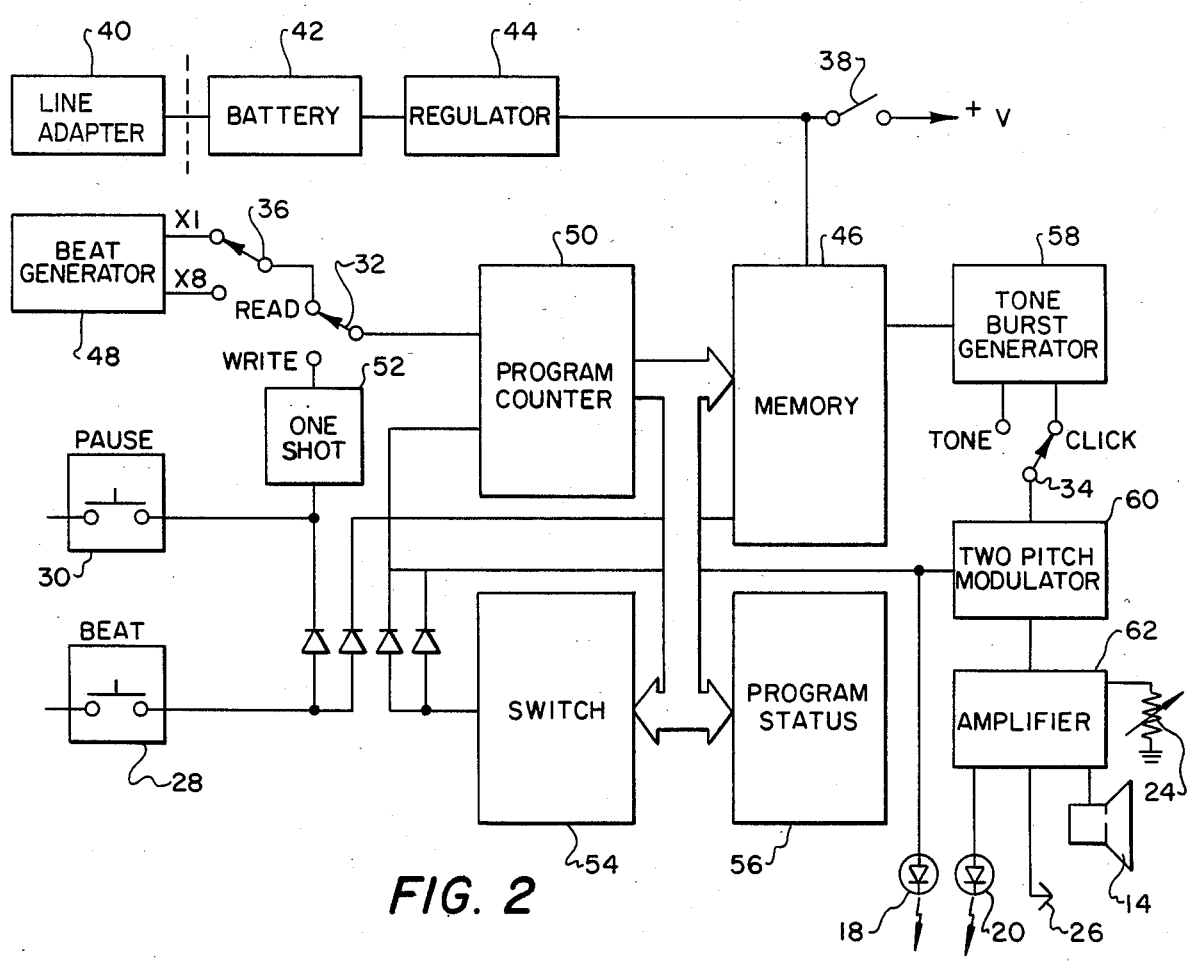
FIG. 2 is a schematic diagram of the circuitry of the electronic metronome of FIG. 1.

Referring now to FIG. 2, there is depicted a schematic diagram of the circuitry of electronic metronome 10 of FIG. 1. The schematic diagram of FIG. 2 is purposely general in nature and various components are depicted in block diagram form due to the fact that numerous alternate circuit configurations may be utilized to accomplish the operation of electronic metronome 10 without departing from the spirit and intent of the present invention. Where possible, the reference numerals utilized in FIG. 2 correspond to the reference numerals utilized in FIG. 1 for identical components.

As can be seen, electronic metronome 10 includes a solid state memory device 46, preferably implemented utilizing a random access memory integrated circuit device. In a preferred mode of the present invention, memory device 46 is implemented utilizing a CMOS integrated circuit device to minimize electrical power consumption. Electrical power for electronic metronome 10 is preferably provided utilizing battery pack 42 and voltage regulator 44. An optional line adaptor 40 may be utilized to substitute for the battery 42 and, as can be seen, the output of speaker 14 is continuously coupled to memory device 46 without regard to the position of power switch 38, which is utilized to couple electric power to the remaining circuitry of electronic metronome 10. By continuously coupling electrical power to memory device 46 the program of digital logic signals contained therein will, of course, be maintained so long as battery pack 42 provides sufficient electrical power.

The operation of electronic metronome 10 can be divided into two separate modes. When read/write switch 32 is positioned in the "read" mode, the output of beat generator 48 is coupled to program counter 50, causing the contents of memory device 46 to be sequentially output to tone burst generator 58. Beat generator 48 is preferably implemented utilizing a CMOS version of the 555 integrated circuit timer with appropriate variable or multiple resistors selected by multiple switch position 22 to enable beat generator 48 to output a selected number of beats or cycles per minute. In the depicted embodiment of the present invention, time switch 36 enables the operator to select the actual output of beat generator 48 or an output multiplied by a selected timing factor (eight in the depicted embodiment).

The thus selected output of beat generator 48 is then coupled to a programmable CMOS counter 50, such as the ICM 7240 manufactured by Intersil. Program counter 50 is utilized to sequentially access each storage location within memory device 46 and to thus couple the output of each location to tone burst generator 58.

Tone burst generator 58 is preferably a fixed CMOS counter such as the ICM 7242, also manufactured by Intersil, and its output is coupled through tone/click switch 34 to two pitch modulator 60. The output of tone burst generator 58 can thus be utilized to generate a "click" or an audible tone, either of which may be coupled to amplifier 62 for a selected amount of amplification as determined by the position of volume switch 24.

The output of program counter 50 is also coupled to program status display 56 which, in the depicted embodiment of the present invention, preferably comprises an eight position light emitting diode array. Those skilled in the art will appreciate that in this configuration the output states of individual lights within status display 56 will correspond to a digital code for the storage location currently being accessed by program counter 50. Multiple position dip switch 54 is also coupled to program status display 56 and by manually determining the position of individual switches within multiple position dip switch 54, the operator can utilize dip switch 54 to select a particular memory location within memory device 46. Thus, when the sequential location within memory device 46 is equal to the predetermined memory location set utilizing multiple position dip switch 54, the output of multiple position dip switch 54 can be utilized to reset program counter 50 back to its beginning and to selectively vary the output of two pitch modulator 60 to permit a selected output beat to be audibly output at a second tone. Thus, it should be appreciated that by selecting a particular memory location within memory device 46 utilizing multiple position dip switch 54, the operator can automatically and repetitively sequence through a selected number of memory locations within memory device 46. Further, the output of multiple position dip switch 54 can be utilized to illuminate light emitting diode 18.

The output of amplifier 62 is utilized to energize light emitting diode 20. Thus, light emitting diode 20 will be energized during each output tone or click from electronic metronome 10 and light emitting diode 18 may be utilized to visually emphasize a particular beat within a group of repeating beats, in addition to the audible emphasis discussed above.

The second mode of operation for electronic metronome 10 is the "write" mode of operation in which the operator may selectively enter a series of digital "ones" or "zeros" into memory device 46 for later conversion into an audible rhythmic pattern. When read/write switch 32 is positioned in the "write" mode, actuation of pause switch 30 and beat switch 28 will cause a logical "zero" or "one" respectively, to be written into memory device 46. When the rhythmic pattern desired has been manually entered via pause switch 30 and beat switch 28, multiple position dip switch 54 may be set to the sequential location indicated by program status display 56 and electronic metronome 10 of the present invention will then automatically and repetitively generate the rhythmic pattern thus entered when placed in the "read" mode of operation.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An electronic metronome comprising:
    (a) a solid state memory device for storing a plurality of digital logic signals;
    (b) means for accessing said plurality of digital logic signals in a selected order;
    (c) means for accessing said plurality of digital logic signals at a selected clock rate, said means including a manually adjustable multiple position switch for directly varying the clock rate without reprogramming said solid state memory device; and
    (d) means coupled to the output of said solid state memory device for converting said plurality of digital logic signals into a plurality of audible signals.

2. The electronic metronome according to claim 1 wherein said solid state memory device comprises a random access memory integrated circuit device.

3. The electronic metronome according to claim 1 wherein said digital logic signals comprises a plurality of logical "ones" and logical "zeros."

4. The electronic metronome according to claim 3 wherein means coupled to the output of said solid state memory device for converting said plurality of digital logic signals into a plurality of audible signals comprises means for generating an audible tone burst in response to an output of said solid state memory device comprising a logical "one."

5. The electronic metronome according to claim 1 wherein said means coupled to the output of said solid state memory device for converting said plurality of digital logic signals into a plurality of audible signals comprises a tone burst generator coupled to an audio output device.

6. The electronic metronome according to claim 5 wherein said audio output device comprises a speaker.

7. The electronic metronome according to claim 1 further including means for generating a visual display correlated to said plurality of audible signals, said visual display comprising at least two light emitting diodes.

8. The electronic metronome according to claim 3 further including input means coupled to said solid state memory device for inputting said plurality of digital logic signals.

9. The electronic metronome according to claim 8 wherein said input means comprises a first input switch for inputting a logical "one" and a second input switch for inputting a logical "zero."

10. The electronic metronome according to claim 9 wherein said first and second input switches comprise momentary contact pushbutton switches.

11. An electronic metronome comprising:
(a) a solid state memory device having a plurality of sequentially addressable storage locations for storing a plurality of digital logic signals;
(b) means for accessing said plurality of digital logic signals in a sequential order from a first storage location to a predetermined last storage location within said solid state device;
(c) means for manually selecting said last storage location;
(d) means for accessing said plurality of digital logic signals at a selected clock rate, said means including a manually adjustable multiple position switch for directly varying the clock rate without reprogramming said solid state memory device; and
(e) means coupled to the output of said solid state memory device for converting said plurality of digital logic signals into a plurality of audible signals.

12. The electronic metronome according to claim 11 wherein said solid state memory device comprises a random access memory integrated circuit device.

13. The electronic metronome according to claim 11 wherein said digital logic signals comprises a plurality of logical "ones" and logical "zeros."

14. The electronic metronome according to claim 13 wherein means coupled to the output of said solid state memory device for converting said plurality of digital logic signals into a plurality of audible signals comprises means for generating an audible tone burst in response to an output of said solid state memory device comprising a logical "one."

15. The electronic metronome according to claim 11 wherein said means coupled to the output of said solid state memory device for converting said plurality of digital logic signals into a plurality of audible signals comprises a tone burst generator coupled to an audio output device.

16. The electronic metronome according to claim 11 wherein said audio output device comprises a speaker.

17. The electronic metronome according to claim 11 wherein said means for accessing said plurality of digital logic signals in a sequential order from a first storage location to a last storage location within said solid state memory device includes means for repetitively accessing said plurality of digital logic signals.

18. An electronic metronome comprising:
(a) a component case adapted to enclose electronic components, said component case being substantially the size of a human hand whereby said case may be easily transported and stored;
(b) a solid state memory device within said component case for storing a plurality of digital logic signals;
(c) access means disposed within said component case for accessing said plurality of digital logic signals in a selected order;
(d) means for accessing said plurality of digital logic signals at a selected clock rate, said means including a manually adjustable multiple position switch for directly varying the clock rate without reprogramming said solid state memory device;
(e) conversion means disposed within said component case for converting said plurality of logic signals into a plurality of audible signals; and
(f) a battery power souce disposed within said component case for providing electric power to said solid state memory device, said access means and said conversion means.

19. An electronic metronome according to claim 18 wherein said component case is constructed of a plastic material.

20. An electronic metronome according to claim 18 further including visual display means disposed on the exterior of said component case for generating a visual display correlated to said plurality of audible signals.

21. The electronic metronome according to claim 18 wherein said solid state memory device comprises a random access memory integrated circuit device.

22. The electronic metronome according to claim 18 wherein said conversion means includes an electronic speaker disposed within said component case.

23. The electronic metronome according to claim 18 wherein said conversion means further includes means for varying the volume of said plurality of audible signals.

* * * * *